March 28, 1967 B. KUSSEROW 3,311,804
D.C. MOTOR WITH CENTRIFUGAL SWITCH
Filed Jan. 20, 1964 4 Sheets-Sheet 2

Inventor:

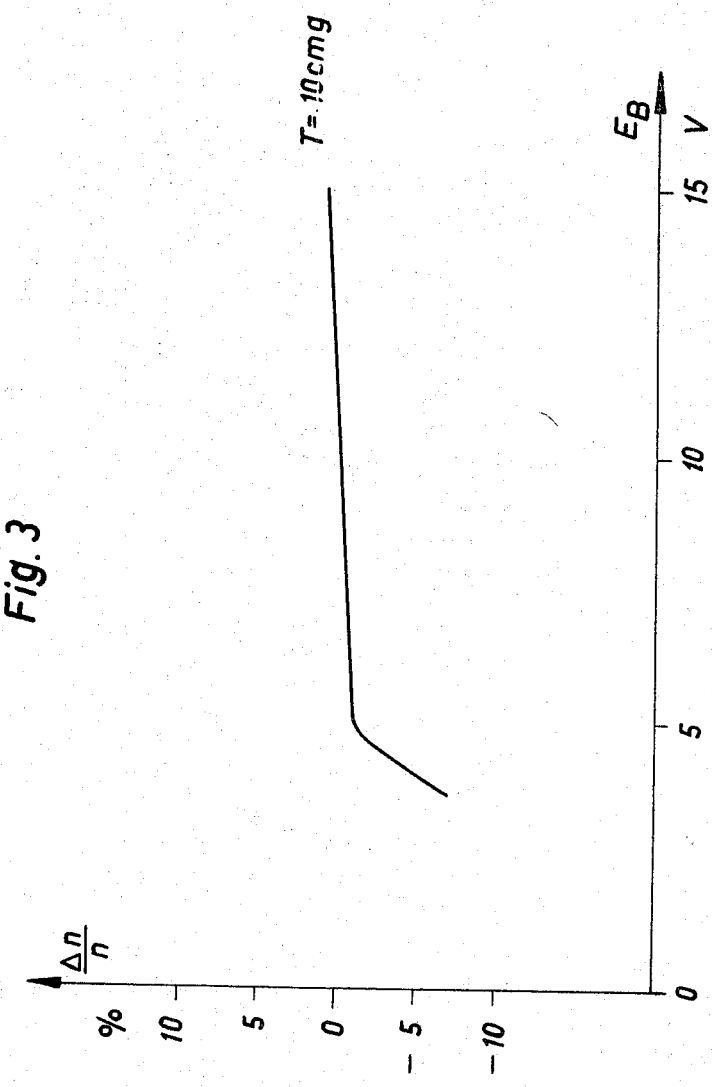

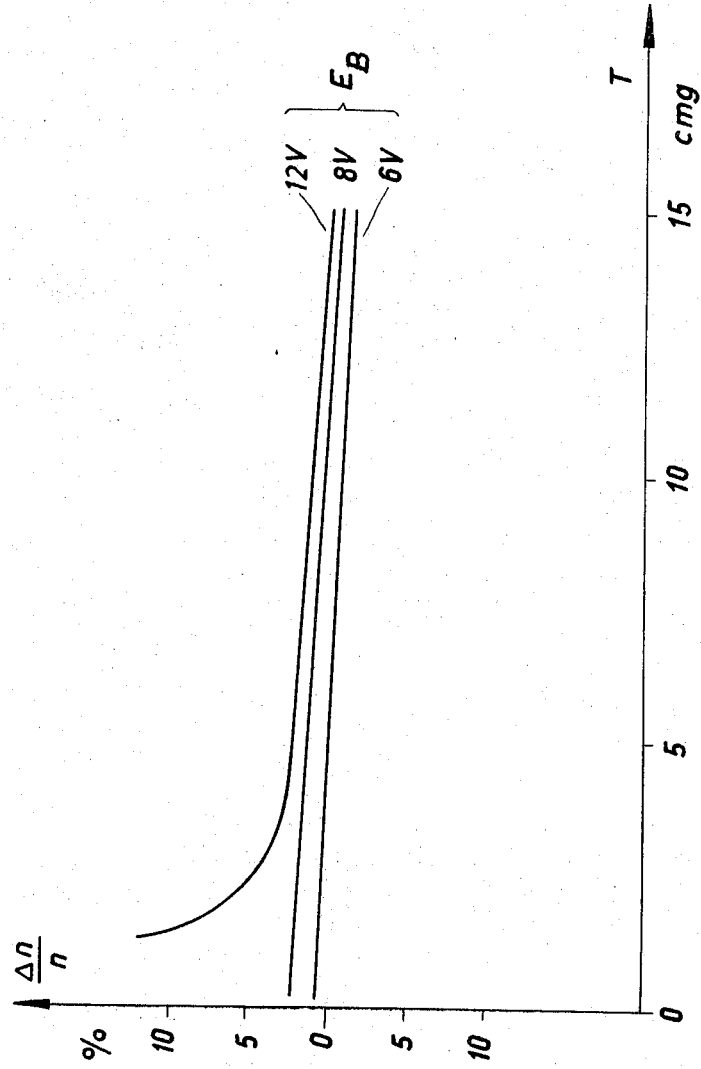

United States Patent Office 3,311,804
Patented Mar. 28, 1967

3,311,804
D.C. MOTOR WITH CENTRIFUGAL SWITCH
Bernd Kusserow, Kronach, Upper Franconia, Germany, assignor to Loewe Opta Aktiengesellschaft, Berlin, Germany, a company of Germany
Filed Jan. 20, 1964, Ser. No. 339,031
Claims priority, application Germany, Jan. 23, 1963, L 43,974
4 Claims. (Cl. 318—325)

The invention relates to speed regulation of D.C. motors, and more particularly to an improved controlling of a D.C. motor supporting a centrifugal switch on its shaft.

The speed of many D.C. motors driving tape recorders is controlled by a centrifugal switch. The switch connections are usually led outward from the motor shaft over slip rings and brushes. However after lengthy running time the changing contact resistances between slip rings and brushes cause faults which impair absolute constancy of motor speed and lead to undesired variations in isochronism (flutter and wow). In addition the components taking part in the slip ring transfer are subject to wear which, as in most cases the brushes are not exchangeable, necessitiates a complete change of motor. Also the friction between the carbon brushes and the slip rings is an often not negligible disadvantage which greatly reduces the efficiency of the motor. A further consequence of friction are running noises.

One way of dispensing with slip rings is to provide an inductive coupling.

For that reason, a known D.C. motor with a centrifugal switch contact is controlled by damping or not damping an oscillator circuit whose rectified oscillations will influence a transistor connected in series with the motor circuit. For that a transformer with one primary and two secondaries is provided, the primary being mounted on the motor shaft and the secondaries being stationary and spaced apart from the primary which forms a damping circuit in combination with a centrifugal switch and a series resistance. One of the secondaries being an induction coil of the oscillator circuit and the other a coupling winding connected with said transistor lying in the motor circuit.

According to the present invention the known device is improved by an oscillator circuit fitted with a capacitive potential divider which provides stabilizing of feedback. Another improvement rests upon a resistance lying in series with the centrifugal switch contact and in parallel with a winding fixed to the motor shaft (damper winding for the oscillator) and producing when the contact is closed, effective damping of the oscillator.

An exemplary arrangement of a speed governor system in accordance with the invention is shown in the accompanying drawing.

Figure 1:
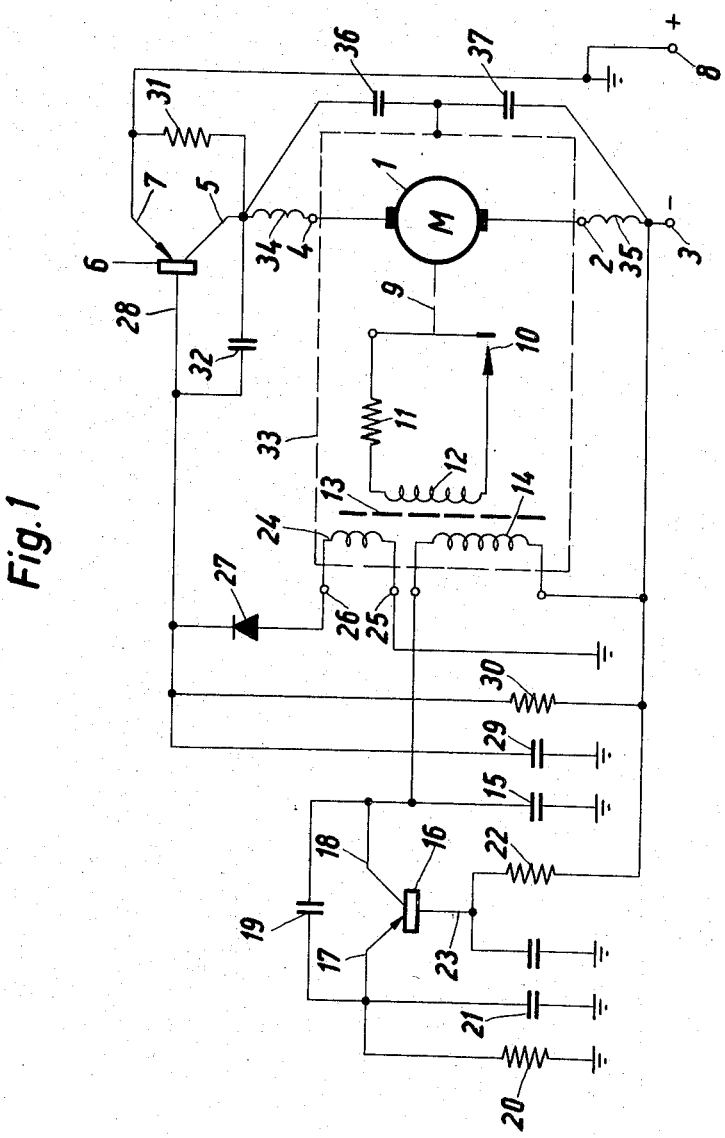
Figure 2:
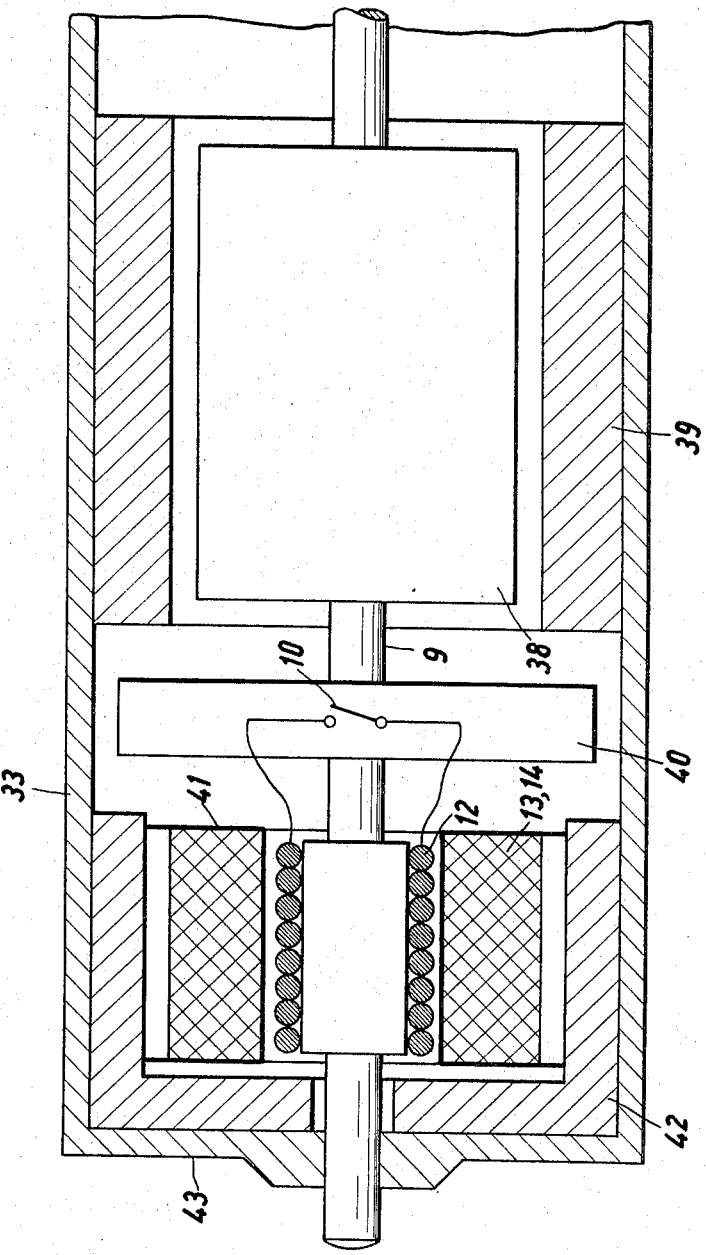

FIG. 1 indicates a wiring diagram of the system,
FIG. 2 indicates a section through the motor and the transformer,
FIG. 3 indicates a diagram showing the speed change in dependence on the operating voltage and
FIG. 4 indicates a diagram showing the speed change as a function of motor load at various operating voltages.

In FIG. 1, 1 indicates a D.C. motor for driving a phonograph recorder, e.g. a magnetic tape recorder. One pole 2 of the motor is connected with the minus terminal 3 of a D.C. potential source, the other pole 4 with the collector electrode 5 of a transistor 6 forming a control amplifier. The emitter electrode 7, of transistor 6 is grounded and/or connected to the positive mains terminal 8. On a motor shaft 9 a centrifugal switch with a centrifugal contact 10 is arranged which is closed at a speed below a pre-set rated speed and opened when the said rated speed is reached. In series with the centrifugal contact and spatially speaking also disposed on the motor shaft are a resistance 11 and a damper winding 12 of a transformer 13, which transformer has a fixed winding 14 forming together with a condenser 15 the frequency-determining oscillating circuit of an oscillator fitted with a transistor 16 whose base electrode is grounded. The emitter electrode 17 and the collector electrode 18 of transistor 16 are bridged by a capacitor 19 which with a capacitor 21 lying parallel to emitter resistance 20 forms a capacitive potential-divider stabilising the feedback coefficient. With a preferably variable resistance 22 lying between the base electrode 23 of transistor 16 and minus pole 3 of the supply source the operating point for transistor 16 can be set.

A stationary winding 24 of transformer 13 is grounded by a connection 25, while the other terminal 26 is connected over a diode 27 with the base electrode 28 of control transistor 6 and is grounded over a capacitor 29. Between diode 27 and capacitor 29 on the one side and terminal 3 on the other a resistance 30, which can be available, is connected. Parallel to the collector-emitter section of transistor 6 there is a motor series resistance 31 and between base 28 and collector electrode 5 a capacitor 32. In the motor circuit there are also arranged outside the motor housing 33 two choke coils 34, 35 and between the respective ends of the choke coils remote from the terminals 2, 4 and the motor housing, condensers 36, 37 are incorporated. The last named choke coils and condensers serve in the known manner to suppress sparking on the motor.

The function of the circuit described is as follows: On D.C. voltage being applied to the terminals 3, 8 the motor first receives approximately the full supply potential because transistor 6 is negatively biased over resistance 30 and consequently the voltage at the collector-emitter section is reduced to a residual voltage. Centrifugal contact 10 is at this moment closed, so that the winding 12 of transformer 13, bridged with resistance 11, damps oscillating circuit 14, 15 and stops the oscillator. Winding 12 must not be totally short-circuited by the centrifugal switch contact because otherwise only wattless power is taken from the oscillating circuit and the oscillator continues to oscillate at a higher frequency. Effective damping of the oscillating circuit is, however, only possible when a resistance is provided in series with the damper winding 12 and rated so as to take the greater active power from the oscillating circuit (power matching). The series resistance 11 may be replaced by an appropriately selected ohmic resistance of transformer winding 12.

When the motor reaches the pre-set rated speed, centrifugal switch contact 10 opens and the oscillator begins to oscillate. In the transformer winding 24 coupled to the oscillator coil 14 an HF voltage is then induced which after rectification with diode 27 positively controls the control circuit of transistor 6, increases the collector-emitter impedance and renders the motor series resistance 31 effective. Resistance 30 provides an optimum load resistance for winding 24 if it has a relatively high value. But in order that the motor may start up rapidly and accuracy of control be adequate, resistance 30 should be small, otherwise the impedance of transistor 6 will not be reduced enough and control will be too sluggish. In practice therefore a compromise is made between the opposed demands.

Capacitor 32 between base 28 and collector electrode 5 of transistor 6 suppresses voltage peaks which might overload the transistor. At the same time the capacitor effects a negative feedback for the high frequency-components of the control impulses, which reduces the running noise of the motor. The series resistance 31 of the motor, active when centrifugal switch contact 10 is open, reduces motor current to a level above zero, from which it again increases to the maximum when motor speed falls below the rated speed and the centrifugal switch contact closes.

In FIG. 2, which shows a preferred design for the mechanical construction of the motor and the transformer, the rotor is marked 38 and the stator of the D.C. motor 1 is marked 39. On shaft 9 of the motor the centrifugal switch 40 is disposed with contact 10, which is connected over a resistance not shown in FIG. 2 to the damper winding 12, which is also disposed on the motor shaft. The bobbin 41 of the transformer windings 13 and 14 surrounds winding 12 leaving an air gap and is set firmly in a ferromagnetic shielded core 42. A housing 33 encloses the motor, the centrifugal switch and the shielded core. The housing with its end 43 forms an end frame for motor shaft 9.

The diagram in accordance with FIG. 3 gives information as to the speed behaviour of a D.C. motor wired in accordance with the invention as a function of operating voltage at rated load. On the ordinate the speed change $$\frac{\Delta n}{n}$$

is marked in percentage, on the abscissa the operating voltage ($E_B$) in volts. The diagram shows that in a regulating range from 5 to 15 volts the speed changes by a maximum of $\pm 1\%$, i.e. a voltage range of 1:3 is controlled adequately even for strict demands. The regulating range is limited in the direction of higher load by the maximal power loss of transistor 6 and resistance 31 and downward by the operating voltage of the motor at rated load and the voltage drop at transistor 6.

Finally FIG. 4 represents a diagram showing the speed change $$\frac{\Delta n}{n}$$

of the motor as a function of torque (T) at different operating voltages ($E_B$). At 12 volts operating voltage the characteristic shows in the low-load range (below 5 cmg.) a strong rise, because then the current flowing through resistance 31 is greater than the no-load current of the motor.

This arrangement, besides eliminating slip rings and brushes, has the advantages that the centrifugal contact is not live at the moment of opening and thus no spark occurs at break and that on closing only an A.C. voltage is short circuited. This increases the life of the centrifugal switch contact substantially.

What I claim is:
1. A speed governor system for a D.C. motor in tape recorders comprising a centrifugal switch contact mounted on said motor shaft and being switched in accordance with a predetermined speed of said shaft, a first and a second transistor each having base, emitter and collector elements, a transformer comprising a primary winding and two secondary windings; said primary winding being mounted on the motor shaft and said secondaries being stationary; said primary, said centrifugal switch, and a series resistance forming a damping circuit; one of said secondary windings being an induction coil of an oscillator with said second transistor in grounded-base circuit, the emitter resistance of said second transistor being by-passed by a capacitor forming a voltage divider in combination with a further capacitor lying between collector and emitter elements of said second transistor; the other secondary winding forming a coupling winding connected with said base element of said first transistor, whose collector and emitter elements being connected in series to the motor circuit; one pole of said other secondary transformer winding being grounded and the other pole being connected over a rectifier with said base element of said first transistor; between said base element and one pole of said motor being incorporated a resistance determining time of running up to speed.

2. A speed governor system as defined in claim 1 in which a capacitor is provided connecting said base element and said collector element of said first transistor.

3. A speed governor system as called for in claim 1 wherein the value of said series resistance equals to the ohmic resistance of said primary winding of the transformer as to provide effective damping of said oscillator.

4. A speed governor system as called for in claim 3 wherein said series resistance is replaced by an appropriately selected ohmic resistance of said primary winding of said transformer as to provide effective damping of said oscillator.

References Cited by the Examiner
UNITED STATES PATENTS

| | | | |
|---|---|---|---|
| 3,143,695 | 3/1964 | Hohne | 318—325 |
| 3,184,671 | 5/1965 | Riggs | 318—325 |
| 3,221,235 | 11/1965 | Scholl | 318—325 |
| 3,221,236 | 11/1965 | Scholl | 318—325 |
| 3,239,739 | 3/1966 | Scholl | 318—325 |

ORIS L. RADER, *Primary Examiner.*
M. O. HIRSHFIELD, J. C. BERENZWEIG,
S. GORDON, *Assistant Examiners.*